United States Patent [19]
Eaton

[11] Patent Number: 5,829,148
[45] Date of Patent: Nov. 3, 1998

[54] SPATIAL MEASURING DEVICE

[76] Inventor: Homer L. Eaton, 5025 Tierra Del Oro, Carlsbad, Calif. 92008

[21] Appl. No.: 636,590

[22] Filed: Apr. 23, 1996

[51] Int. Cl.[6] .................................................. G01B 5/004
[52] U.S. Cl. .............................. 33/503; 33/1 PT; 439/24
[58] Field of Search ..................... 33/503, 1 PT, 33/504, 1 M, 1 N, 1 V; 439/18, 20, 23, 24, 25, 26

[56] References Cited

U.S. PATENT DOCUMENTS

| | | |
|---|---|---|
| 3,944,798 | 3/1976 | Eaton . |
| 4,313,263 | 2/1982 | McMurtry ................................ 33/503 |
| 4,388,758 | 6/1983 | Ernst et al. ............................. 33/1 PT |
| 4,593,470 | 6/1986 | Davies .................................... 33/1 PT |
| 4,606,696 | 8/1986 | Slocum ................................... 33/1 PT |
| 4,676,002 | 6/1987 | Slocum ................................... 33/1 PT |
| 4,703,443 | 10/1987 | Moriyasu ................................. 33/503 |
| 4,888,877 | 12/1989 | Enderle et al. ........................... 33/503 |
| 5,084,981 | 2/1992 | McMurtry et al. ....................... 33/503 |
| 5,148,377 | 9/1992 | McDonald . |
| 5,174,039 | 12/1992 | Murai ...................................... 33/504 |
| 5,402,582 | 4/1995 | Raab . |

FOREIGN PATENT DOCUMENTS

| | | | |
|---|---|---|---|
| 4140294 | 1/1993 | Germany | ................................ 33/1 M |

Primary Examiner—Diego F. F. Gutierrez
Assistant Examiner—Andrew Hirshfeld
Attorney, Agent, or Firm—Henri J. A. Charmasson; John D. Buchaca

[57] ABSTRACT

An articulated coordinate measuring arm having swiveling joints which are unlimited by an end-stops. Power and signals are transmitted through a swiveling joint using a multi-conductor electrical slip-ring sub-assembly. Joint position transducer signal conditioners are closely located to the joint position transducers to reduce signal noise degradation. Rigid transfer members connecting the joints comprise a freely rotating shaft mounted within an outer sheath, wherein both shaft and sheath extend substantially the length of the transfer member, and the shaft outer diameter approaches that of the sheath inner diameter.

17 Claims, 10 Drawing Sheets

5,829,148

SPATIAL MEASURING DEVICE

FIELD OF THE INVENTION

This invention relates to measuring devices, and more particularly to articulated arm coordinate measuring machines for measuring three-dimensional objects.

BACKGROUND OF THE INVENTION

The ever-increasing complexity and sophistication of commercial and industrial components and assemblies, and the need for quality assurance during certain interim stages in their manufacture and assembly, along with the typical market pressures for cost reduction have prompted new methods of measuring complex three-dimensional parts in a fast, precise, accurate and reliable manner.

This is particularly true in the area of commercial or industrial quality assurance where numerous complex mechanical components are separately created with exacting tolerances for later assembly. In order to efficiently ordinate these systems, method and apparatuses for measuring the components have been devised.

An example coordinate measuring machine is described in Eaton, U.S. Pat. No. 3,944,798 and Raab, U.S. Pat. No. 5,402,582, both of which are incorporated herein by reference. In general, these devices comprise an articulated arm terminating in a probe. The arm has a plurality of rigid transfer members connected end-to-end with a series of joints. The position of the probe in space at a given instant in time can therefore be calculated by knowing the length of each member and the specific position of each of the joints. The operator simply manipulates the arm and takes readings at various points on the artifact being measured. Each of these readings is recorded and processed by an electronic recorder/analyzer to obtain the desired dimensions of the artifact.

The probe can be manipulated to reach any point in space within substantially a sphere centered on the base of the arm. This is called the measurement sphere of the machine. Any article being measured must therefore lie within the measurement sphere.

A critical step in the measurement process is determining the position of each of the joints at a given instant in time. Typically, the joints are broken down into singular rotational degrees of freedom, each of which is measured using a dedicated rotational transducer. Each transducer outputs an electrical signal which varies according to the movement of the joint in that degree of freedom. The signal is carried on wires through the arm to the recorder/analyzer.

In order to maximize precision, it is important that the transducers be mechanically coupled to the joint as directly as possible. This usually requires that the transducers be incorporated into the joints of the arm.

In recent times, the transducer of choice is an optical encoder. A detailed description of the operation of optical encoders may be found in the optical encoder sales brochures available from Heidenhain Company of Traunrent, Germany. In general, each encoder measures the rotational position of its axle by coupling is movement to a pair of internal wheels having successive transparent and opaque bands. Light is shined through the wheels onto optical sensors which feed a pair of electrical outputs. As the axle sweeps through an arc, the output of the analog encoder is substantially two sinusoidal signals which are 90 degrees out of phase. Coarse positioning occurs through monitoring the change in polarity of the two signals. Fine positioning is determined by measuring the actual value of the two signals at the instant in question. Maximum accuracy is obtained by measuring the output precisely before it is corrupted by electronic noise.

A problem with prior designs involves a loss in precision due to signal degradation as the signal is transmitted down wires to the recorder/analyzer. A machine which minimizes signal degradation is therefore preferable.

Another problem with current designs is a restriction on the movement of the joints due to wiring. In prior designs, the arm and its joints carry wiring for transmitting power and signals to and from the probe and transducers. Although the wiring is flexible, the rotational freedom of the joints must be restricted to prevent over-coiling.

Usually, the structures employed to restrict this motion are in the form of single or multiply "stacked" end-stops. Each "stack" of end-stops ideally allows up to 360 degrees of motion before stopping. However, it has been found that using more than one or two stacks increases cost and/or reduces precision to the point of being prohibitive.

Encountering any mechanical end-stop results in delays and inconvenience to the operator since the arm must be "unwound". Additionally, there is wear and tear on the wiring itself. An arm which is not so restricted would therefore be preferable.

The accuracy and resolution of any coordinate measuring machine is dependent on the rigidity of the members and the accurate transmission of motion to the joints and their transducers. In the past, this required that the arm be made to expensive exacting tolerances, and made of strong materials such as steel with numerous complicated structural supports. This often translated into an increase in weight requiring complicated counterbalance mechanisms to obviate operator fatigue. These mechanisms tend to adversely affect precision. Therefore, a light-weight, rigid arm is preferable.

Finally, as with any machine, a certain degree of modularity is preferable so that repairs may be made quickly. Failed sub-assemblies may simply be replaced with a new sub-assembly, instead of attempting to repair the sub-assembly in situ. Therefore, an arm having interchangeable sub-assemblies is preferable.

Accordingly, there is a need for an inexpensive, light-weight, high precision coordinate measuring arm which offers unrestricted probe motion from any given orientation, and offers modular interchangeability to promote fast repair and size configurability.

SUMMARY OF THE INVENTION

The principal and secondary objects of this invention are to provide an inexpensive, light-weight, high precision, sleek profile coordinate measuring arm which offers unrestricted probe motion from any given orientation.

It is a further object of the invention to provide a modularized arm having interchangeable sub-assemblies and greater user configurability.

These and other valuable objects are achieved by a multi-jointed arm having: 1) swiveling joints which are unlimited by one or more end-stops; 2) signal conditioning means closely located to the joint position transducers; and 3) stable transfer members which comprise a freely rotating shaft mounted within an outer sheath, wherein both shaft and sheath extend substantially the length of the member.

DESCRIPTION OF THE PREFERRED EMBODIMENT OF THE INVENTION

Figure 1:
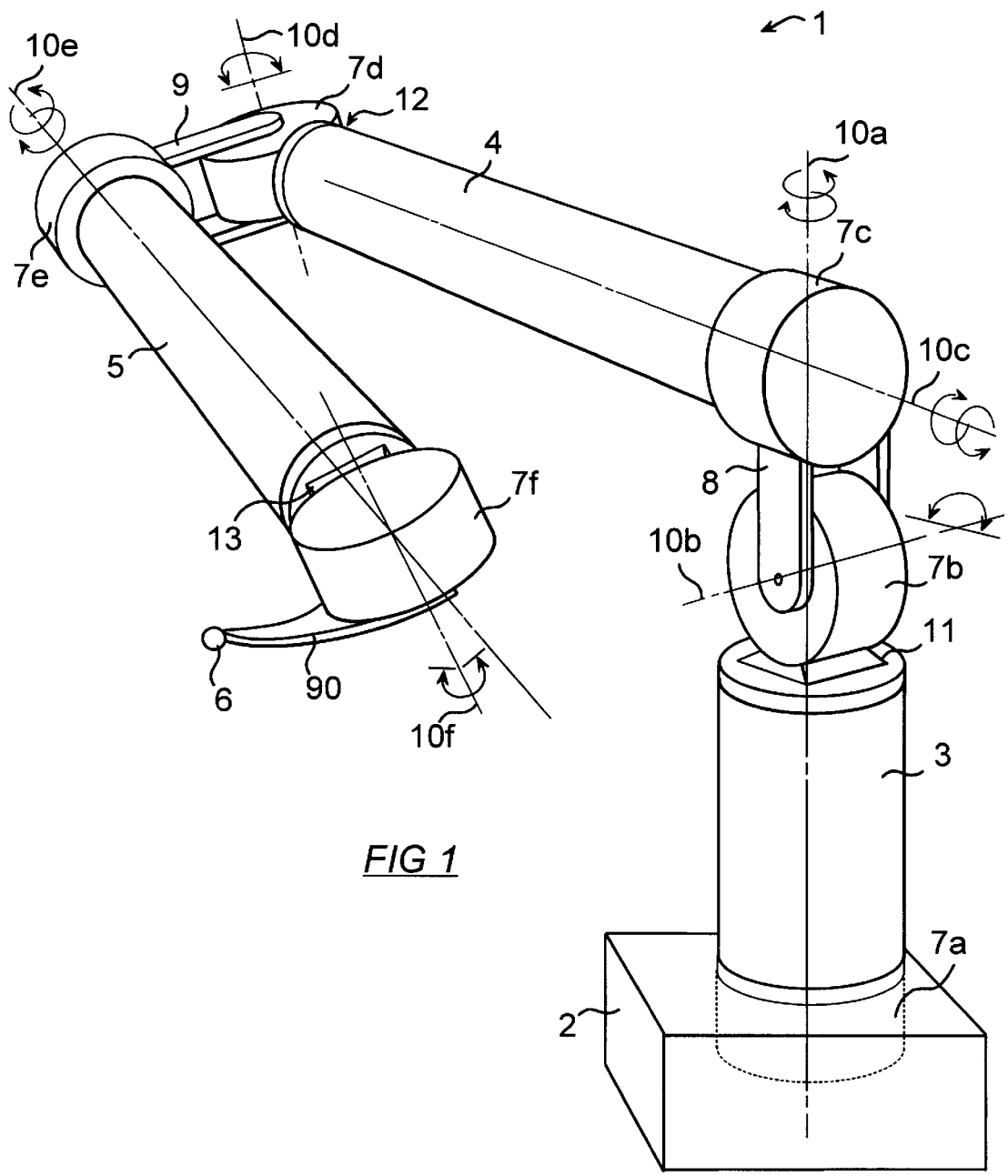
FIG. 1 is a three-dimensional diagrammatic perspective stylized illustration of a coordinate measuring device showing the range of motion of the joints according to the invention.

Referring now to the drawing, there is shown in FIG. 1 a three-dimensional diagrammatic view of the spatial coordinate measuring machine arm 1 according to the invention. The arm comprises a stationary support base 2, three rigid transfer members 3,4,5 and a probe 6 which are interconnected with a plurality of joints 7a,7 b,7c,7d,7e,7f. Each of the joints is dedicated to a single degree of freedom and allows rotational movement about a dedicated axis 10a–10f which is fixed relative to that joint.

The joints can be divided into two categories, namely: 1) those joints 7a,7c,7e which allow the swiveling motion associated with a specific member (hereinafter, "swiveling joints"), and 2) those joints 7b,7d,7f which allow a change in the relative angle formed between two adjacent members or between the probe and its adjacent member (hereinafter, "hinge joints").

Each of two pairs of joints 7b,7c and 7d,7e, are connected via a yoke, 8 and 9 respectively. Each hinge joint 7b,7d,7f is connected to its adjacent transfer member 3,4,5 by means of a pedestal 11,12,13, respectively. The pedestal precisely orients the rotational axis of its hinge joint orthogonally to the major axis of its adjacent transfer member.

The swiveling joints 7a,7c,7e are unlimited in their range of motion. This capability is accomplished without using any "stack" type structures described earlier. This is in stark contrast to prior designs. The preferred hinge joints 7b,7d,7e however, are limited by interference between adjacent members. Although this interference is not required, as shown by Raab (U.S. Pat. No. 5,402,582), which utilizes offset or skewed adjacent members; it has been found that the preferred approach offers a symmetrical design without sacrificing rigidity, and a sleeker profile which more conveniently allows access through narrower passageways. Non-symmetrical designs must cope with greater momentary forces generated by the orthogonally arranged members.

Figure 2:
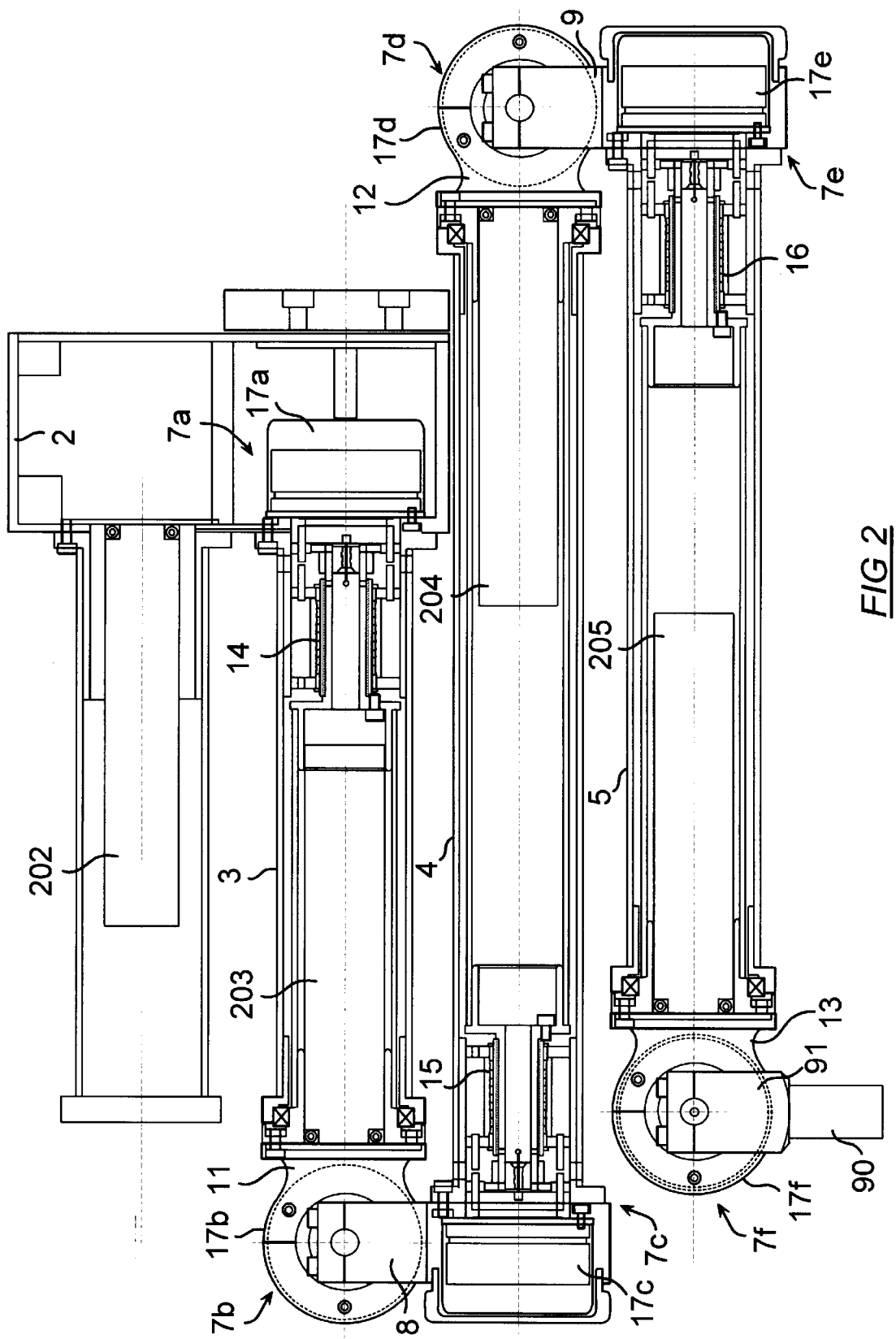
FIG. 2 is a cross-sectional view of the preferred arm according to the invention.

FIG. 2 shows cross-sectional view of the preferred coordinate measuring arm. Six joints 7a–7f are connected by three transfer members 3–5, two yokes 8,9, and three pedestals 11–13.

The invention is able to achieve unlimited motion in the swiveling joints by eliminating the need for a continuous, flexible wire running between the joints straddling a swiveling joint. The preferred means for conducting power and signals through these joints replaces wires with a multiconductor electrical slip-ring sub-assembly. Therefore, there is a slip-ring sub-assembly 14,15,16 operatively associated with each swiveling joint 7a,7c,7e. The slip-ring sub-assembly will be described in detail later.

Each hinge or swiveling joint has its own dedicated motion transducer in the form of an optical encoder 17a–17f. Hinge joint encoders 17b, 17d and 17f are shown hidden in FIG. 2. Since each encoder forms an integral part of each joint by providing primary rotational bearings, it is important that the encoder be structurally rugged.

Figure 3:
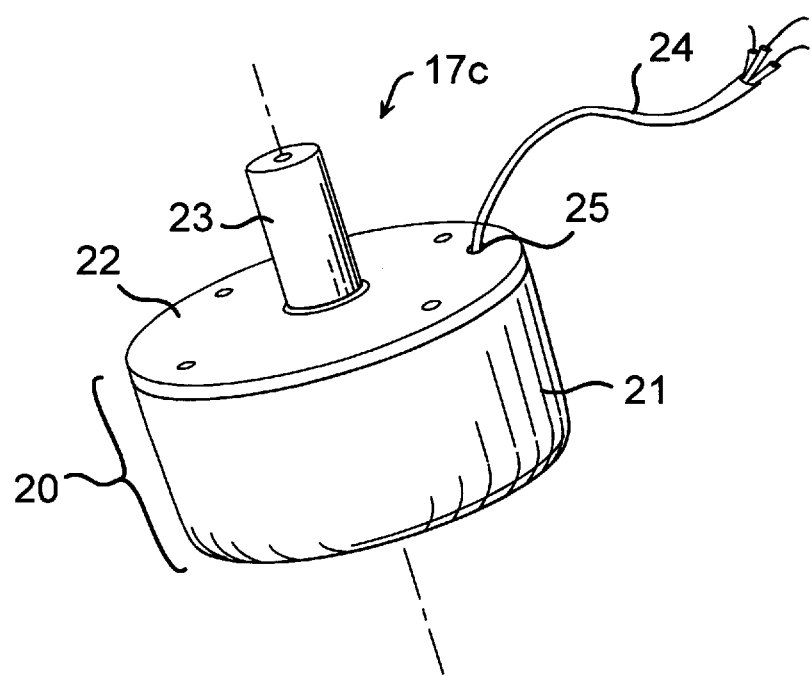
FIG. 3 is a three-dimensional illustrative view of the preferred structure of the transducers used in the invention.

As shown in FIG. 3, a encoder 17c comprises a generally cylindrical body 20 having an outer housing comprising a cup-shaped casing 21 and a circular face plate 22. A central axle 23 is rotatively mounted to the body on internal bearings and extends through the face plate. An electrical cable 24 carries power to the encoder and output signals from the encoder through an aperture 25 in the housing.

The preferred encoder is a ROD 450.0000–5000 model analog optical encoder available from Heidenhain of Traunrent, Germany. These encoders offer structural ruggedness by having a large central axle and bearing. Ideally, this encoder is capable of resolutions of about 5000 cycles per revolution.

Digital encoders are available and could be used in the invention; however, currently available designs are not preferred. Some "digital" encoders which use simple clipping circuits to generate a square, rather than sine wave output, suffer from inferior resolution. True digital encoders having onboard digitizing circuitry currently suffer from being too bulky. However, as circuit board sizes decrease, adequate encoders may become available. Current digital encoders are also more expensive and less versatile with respect to the type of systems they are capable of interfacing.

Because the encoder housing forms part of the outer surface of the arm, slight modifications to the encoders may be required. Power and output wires should not be exposed and should therefore run through portions of the housing having contact with internal cavities of the arm. Means for mounting the encoders to the arm may require additional modifications, however, preferred mounting occurs primarily through screw attachment to the structurally rugged face plate.

Figure 4:
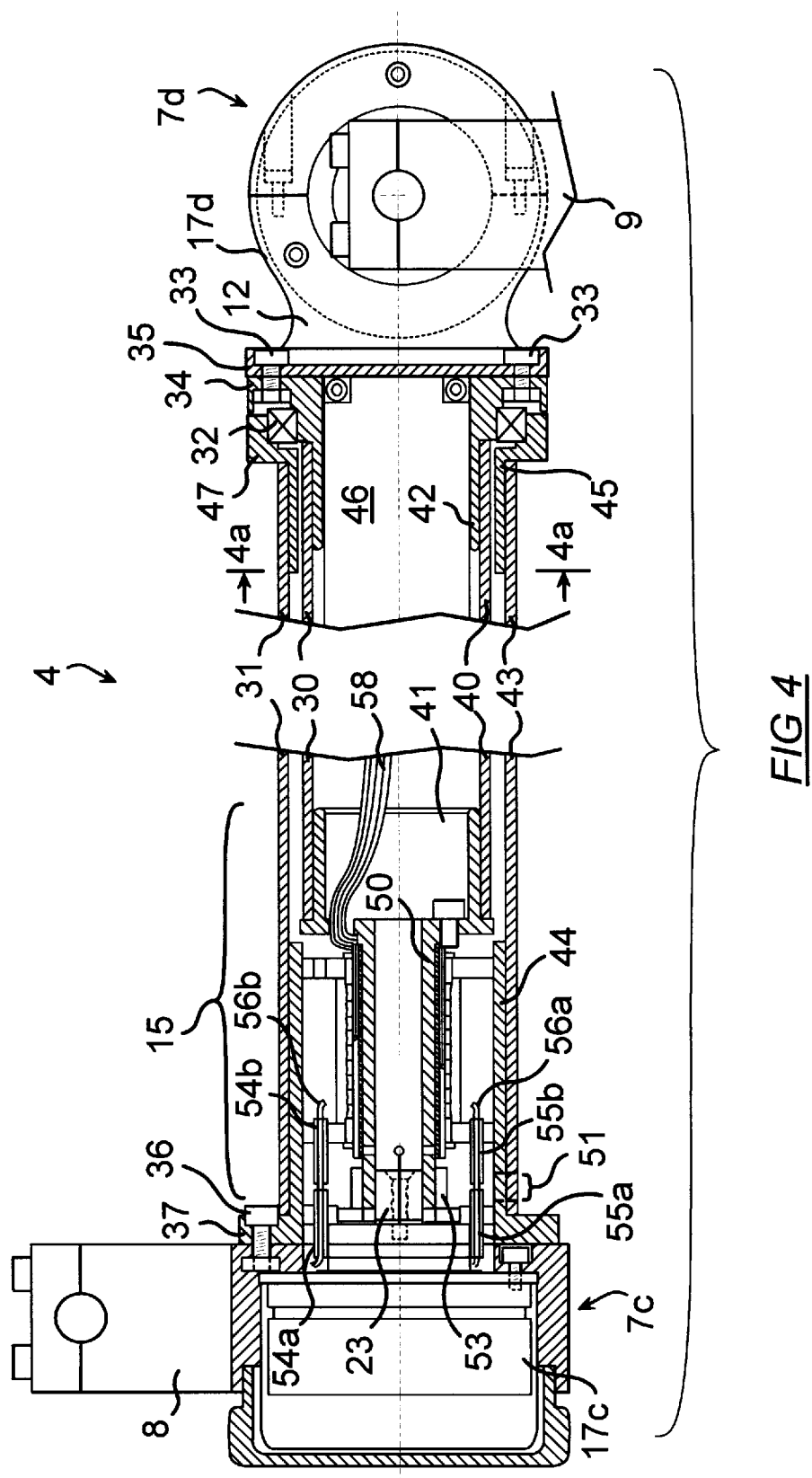
FIG. 4 is close-up partial cross-sectional view of a transfer member and its adjacent joints.
Figure 4A:
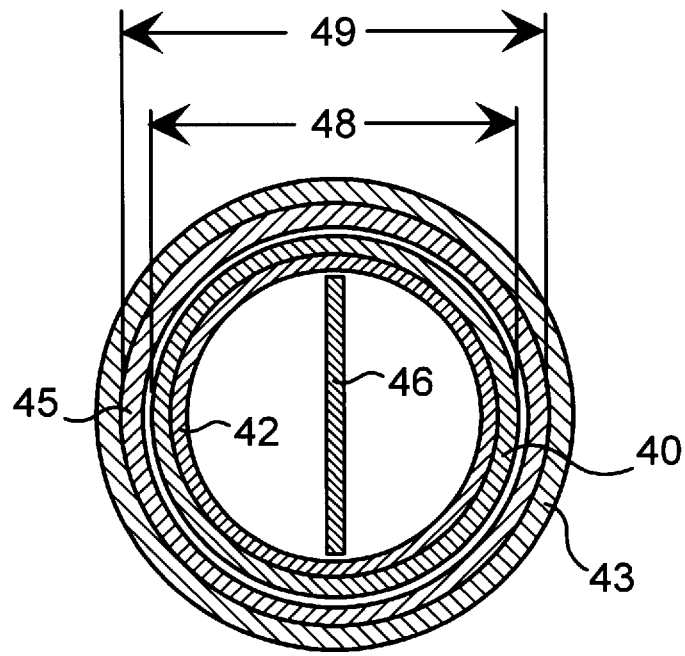
FIG. 4a is a diagrammatic cross-sectional end view of FIG. 4 taken along line 4a—4a FIG. 5 is a three-dimensional illustrative view of a dual projection yoke for mechanically connecting adjacent joints.
Figure 5:
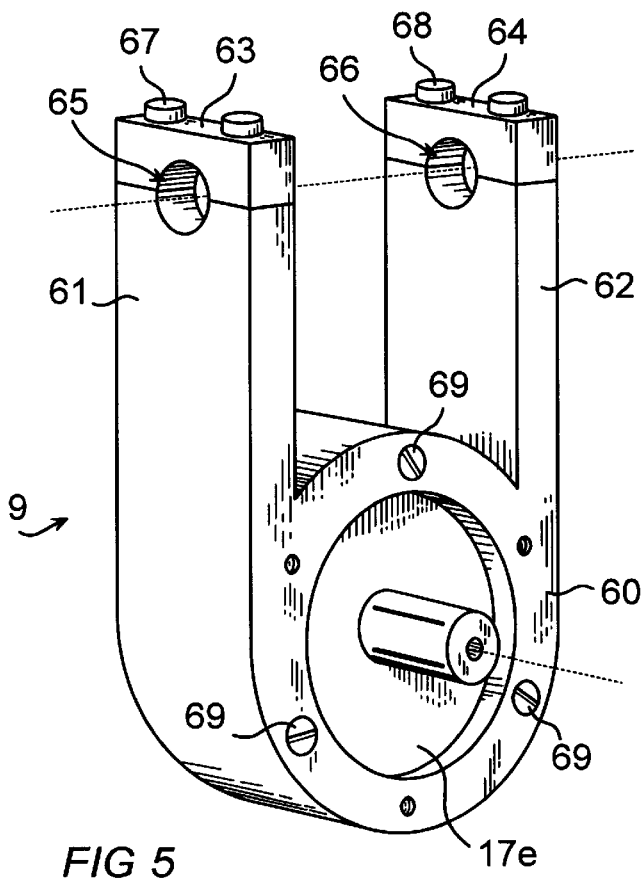

The preferred structure of the transfer members and their connection to adjacent joints will now be described with reference to FIGS. 4, 4a and 5. Each transfer member 4 is in the form of a dual concentric tubular structure having an inner tubular shaft 30 rotatively mounted coaxially within an outer tubular sheath 31 by means of a first bearing 32 mounted proximately to a first end of the member 4 adjacent to a hinge joint 7d, and a second bearing comprising a slip-ring sub-assembly 15 in combination with the encoder 17c of an adjacent swiveling joint 7c located at an opposite end of the member.

The shaft 30 is mounted to the hinge joint 7d by fastening means such as nut and screws 33 connecting the shaft end flange 34 to base plate 35 of pedestal 12. The sheath 31 is mounted to the swiveling joint 7c by fastening means such as nut and screws 36 connecting the sheath end flange 37 to the yoke 8.

By extending the first bearing 32 out to the maximum practical distance away from the encoder of the swiveling joint 17c, the amount of axis misalignment between encoder and the swiveling shaft are kept to a minimum, thereby increasing precision.

The shaft 30 comprises a rigid cylindrical tubular body 40 having opposite ends to which are bonded first and second end-caps 41,42. The end-caps are glued to the body in such a way that the resulting member is precisely and accurately balanced. The preferred method of assuring this balance involves allowing the glue to cure while the assembled member is being revolved.

Portions of the interior surface of the shaft body contacting the end-caps may be scored or otherwise grooved to provide a more positive bonding surface for the glue. Likewise, relevant portions of the end-caps may be scored in lieu of or in addition to the body scoring. The sheath 31 comprises a rigid tubular body 43 having similarly attached first and second end-caps 44,45.

The end-caps of both the sheath and shaft are structured specifically to interface their respective joints. Therefore, the first end-cap 42 of the shaft 30 provides an outer surface for mounting the first bearing 32, and a flange 34 for attachment to the pedestal 12. Likewise, the first end-cap 45 of the sheath 31 has female coupling flange 47 for engaging the outer surface of the first bearing 32.

The second end-cap 41 of the shaft 30 is integral with the central axle 50 of the slip-ring sub-assembly 15 dedicated to swiveling joint 7c.

An access hole 51 extends through a side wall of both the sheath 31 and the second end-cap 44 of the sheath to allow for the loosening of the split collar clamp 53 which firmly couples the central axle 50 of the slip-ring to the swiveling joint encoder axle 23. This allows for quick decoupling during repair or reconfiguration.

The end-caps are preferably made from an easily machinable, inexpensive, light-weight, rigid material such as aluminum.

The use of cylindrical tubes for both sheath and shaft is preferred because they offer construction simplicity, rigidity, light weight, and space inside for the printed circuit board 46 feature of the invention. Also, as shown in FIG. 4a, they allow a concentric mounting of a shaft tubular body 40 having an outer diameter 48 approaching the inner diameter 49 of the sheath tubular body 43, thereby increasing rigidity while maintaining low weight and a sleek profile. Therefore, the shaft tubular body outer diameter is preferably at least 50%, and most preferably at least 75% of the inner diameter of the sheath tubular body.

In the preferred approach the closeness of these two diameters is limited by the interposition of the sheath's first end-cap 45 between the diameters. Although the end-cap could be designed to bond with the outer surface of the sheath body, thereby allowing the two diameters to be closer, it has been found that the preferred design is less expensive with respect to machining tolerances while maintaining adequate rigidity.

The tubes are preferably made from a light-weight, rigid material such as epoxy bonded carbon graphite which inexpensively offers a strength to weight ratio in excess of that of steel. Another advantage of carbon graphite is that it has a low thermal expansion coefficient. Although temperature transducers are commonly used in coordinate measuring machines so as to compensate for the thermal expansion of the arm and the article being measured, errors in compensation are reduced in arms having a lower overall thermal expansion coefficient.

The inherent rigidity and light weight of the coaxially mounted sheath/shaft member wherein the shaft has a wide diameter, alleviates the need for any additional structural bracing or duplex-style or spaced bearing sets. Also, the shaft and sheath may be made from lighter, inexpensive, and easily machined material such as aluminum, or the preferred carbon graphite. A lighter overall arm provides less operator fatigue, reducing the need for complex counterbalances or springs which may reduce precision. However, the invention can be easily modified to incorporate counterbalance mechanisms. Also, the amount play or backlash inherent in a coupled system is significantly reduced by having direct coupling between the various components.

Figure 6:
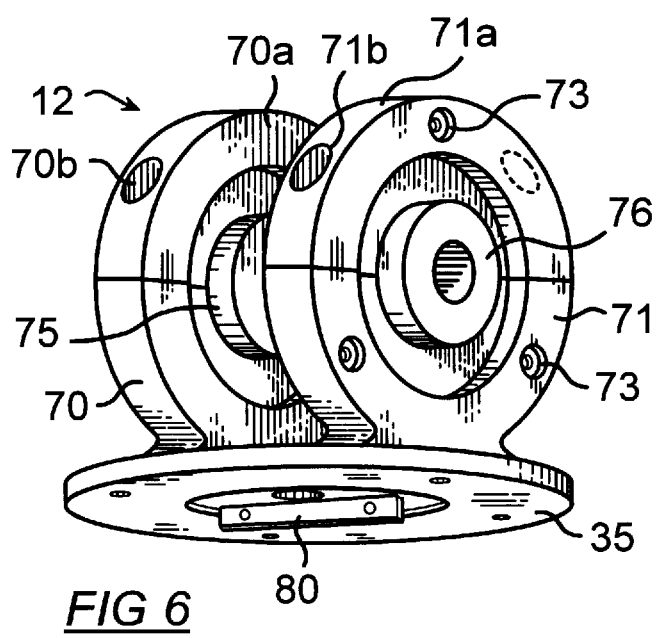
FIG. 6 is a three-dimensional illustrative view of a pedestal for connecting a hinge joint to a transfer member.
Figure 7:
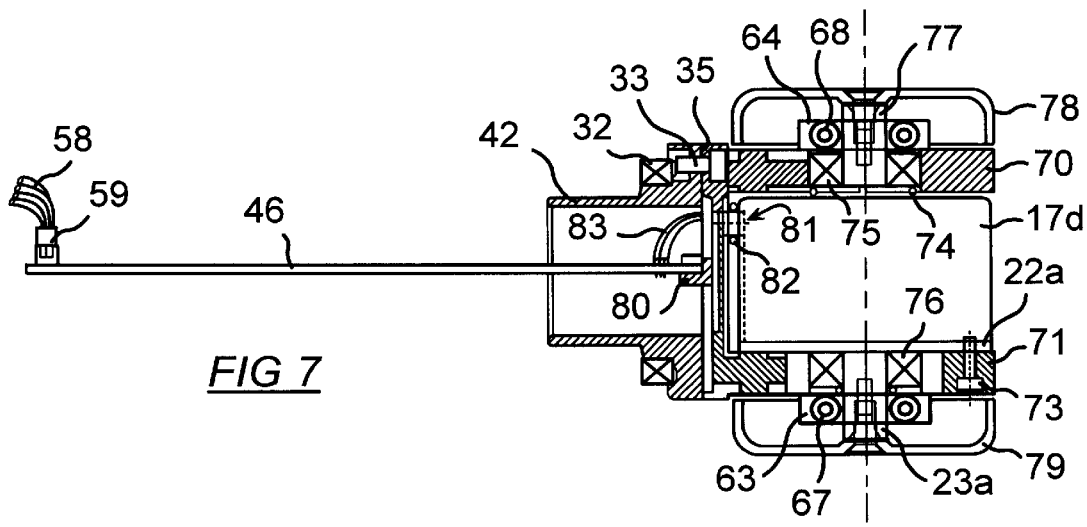
FIG. 7 is a cross-sectional view of a hinge joint taken along a plane defined by the joint's rotational axis and the major axis of its adjacent transfer member.
Figure 8:
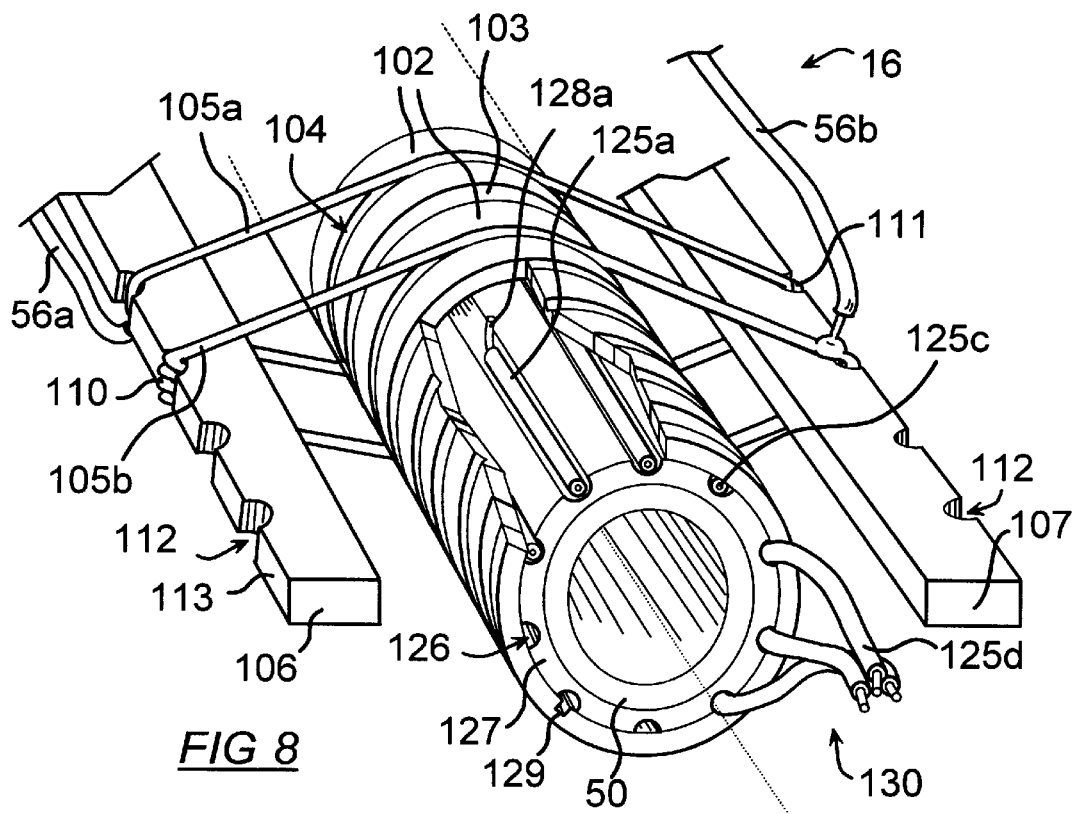
FIG. 8 is a three-dimensional illustrative view of a portion of a slip-ring sub-assembly.
Figure 9:
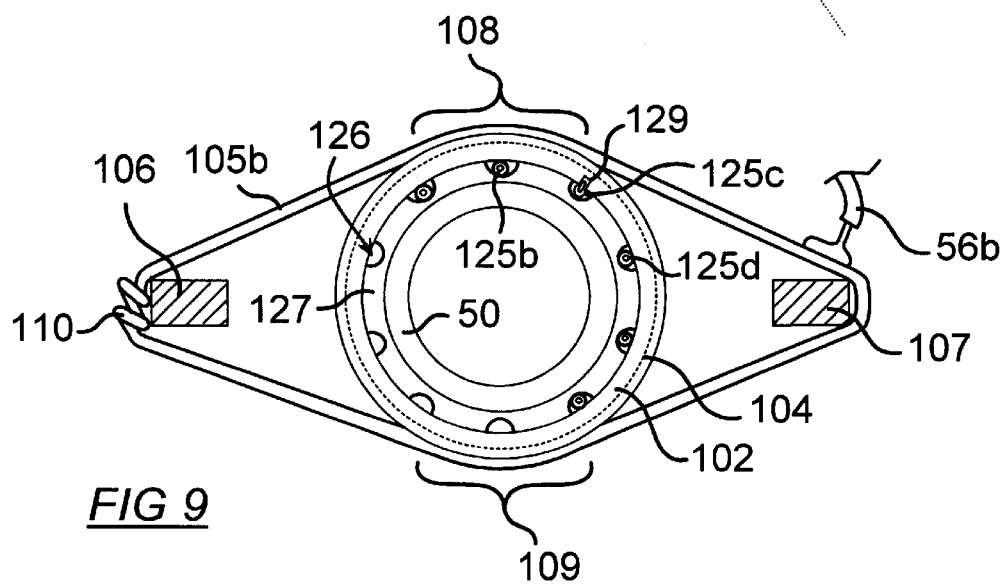
FIG. 9 is a cross-sectional view taken perpendicular to the axis of rotation of the slip-ring sub-assembly shown in FIG. 8.
Figure 10:
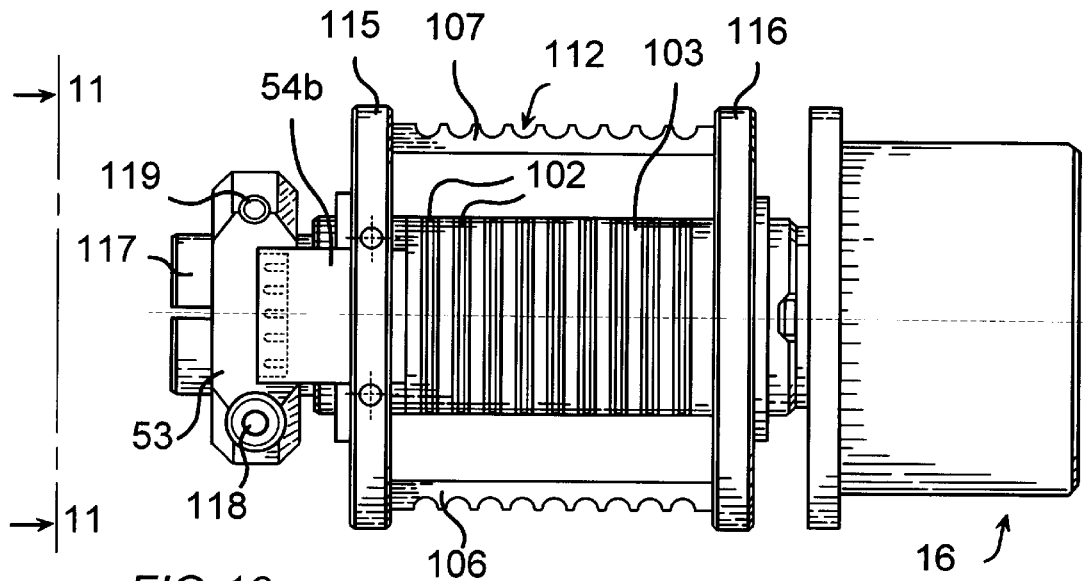
FIG. 10 is a top plan view of a portion of a slip-ring sub-assembly according to the invention.
Figure 11:
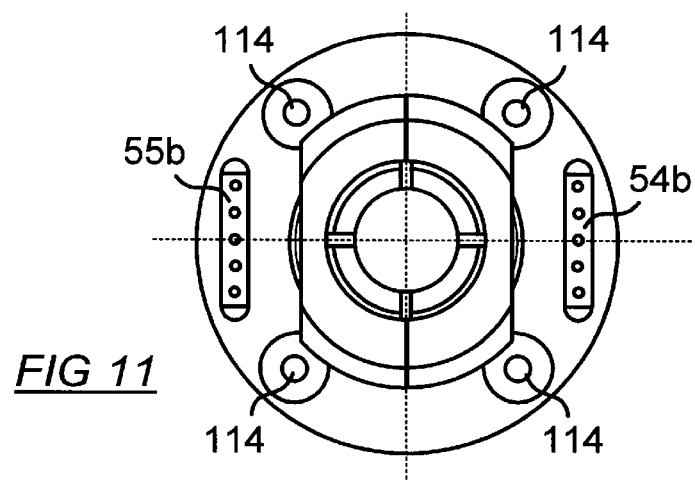
FIG. 11 is an end view of the slip-ring sub-assembly of FIG. 10 taken along line 11—11.
Figure 12:
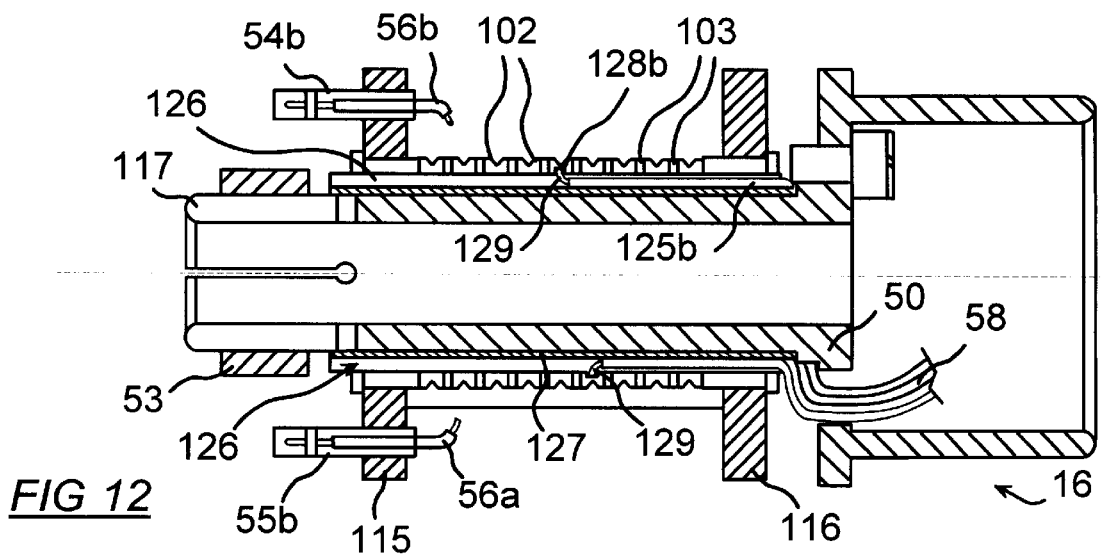
FIG. 12 is a diagrammatic cross-sectional side view taken parallel to the axis of rotation of a portion of a slip-ring sub-assembly.

The preferred structure of the yokes and pedestals will now be described with reference to FIGS. 5–7. Each of the dual projection yokes 8,9 comprises a fork structure with a base 60 and dual support projections 61 and 62. The base 60 is mounted to the face plate of the encoder 17e of a swiveling joint using fastening screws 69. Each support projection mounts to the pivoting axle of an adjacent hinge joint by means of a releasable stock-type split clamp 63,64, each having a hole 65,66 sized to allow engagement with the axle. The tightness of the clamp is adjusted by end screws 67,68.

Each pedestal 11,12,13 comprises a circular base plate 35 which mounts to the first end-cap 42 of a member shaft using fastening means such as nuts and screws 33. The base plate 35 is integral with two parallel, facing circular coupling plates 70,71 spaced apart to allow for the placement of an encoder between them. Each coupling plate comprises a stock-type split clamp 70a,71a for mounting bearings 75,76. The tightness of the clamp is adjusted by end screws which engage the lower portions of the plates through recesses 70b,71b.

One coupling plate 71 attaches directly to the encoder's face plate 22a using screw fastening means 73. The first bearing 76 allows the encoder axle 23a to freely rotate with respect to the pedestal. The other coupling plate 70 supports the encoder 17d from the back using an O-ring spacer 74 contacting the encoder and a bearing 75 mounted to the coupling plate. The second bearing 75 allows a dummy axle 77 to freely rotate with respect to the pedestal. The dummy axle 77 and the encoder axle 23a form the pivoting axle for this hinge joint. Protective end-guards 78,79 are attached to the axles using screw fastening means.

The pedestal 12 also provides a bracket 80 for mounting the printed circuit board 46 of the hinge joint's adjacent member. Wiring 83 soldered to the circuit board 46 passes to the encoder 17d through an opening 81 in the base plate 35 and an O-ring type bushing 82 traversing the space between the encoder and pedestal.

Wiring 58 between the printed circuit board (PCB) 46 and its adjacent slip-ring sub-assembly connects to the PCB using an electrical connector 59 common in the art.

A similar yoke and pedestal connects joints 7b and 7c.

A yoke having encoder straddling dual projections, although not necessary, is preferred because it strengthens the joint making it less susceptible to moment forces acting on the joint.

However, referring back to FIG. 2, it has been found that the joint 7f closest to the probe 6 does not require a dual projection yoke due to the light loading of this joint. However, a larger probe may require a dual projection yoke. The half yoke 90 with a single support projection 91 also provides the operator greater comfort and ease of use while grasping the probe.

A preferred slip-ring sub-assembly will now be described in detail with reference to FIGS. 4 and 8–12. Electrical signals are transmitted through the swiveling joints using a slip-ring sub-assembly 16. Each slip-ring sub-assembly comprises a central cylindrical shaft or axle 50 along which has been mounted a plurality of cylindrical contact rings 102 each made of copper, bronze or other inexpensive electrically conductive material. The material need not be especially durable because of the light loading and low rate of revolution to which the sub-assembly will be subjected.

Adjacent contact rings are separated from each other by spacers 103 of insulating material. Each contact ring has a central, V-shaped groove 104 embedded circumferentially around its outer surface. The groove is sized to provide tracking and electrical contact for a portion of a contact wire 105b stretched transversely across the contact ring. The contact wire is made from an electrically conductive, ductile, corrosion resistant and somewhat strong material. The preferred material is silver because of its availability and positive wear characteristics when contacting copper or bronze.

Each wire is in the form of a loop mounted on two prongs 106,107 of a support rack which straddles the contact ring and axle combination. Therefore, each wire has first and second portions 108,109 contacting the top and bottom of the contact ring 102. The wire is biased toward the ring by means of a spring 110 located on a section of the loop contacting one of the prongs 106 of the support rack. On an adjacent wire 105a, the spring portion 111 of the loop is located on the opposite prong 107 so that the spring forces acting on the slip ring are balanced. The wires are kept in place by the V-shaped grooves and U-shaped channels 112 set into the surface 113 of the prong facing away from the axle 50.

The slip-ring axle 50 is rotatively mounted concentrically within a pair of circular support spacers 115,116 which are each connected to opposite ends of the prongs 106,107 of the wire loop support rack. The spacers are additionally braced by bracing members (removed in FIG. 10) attached by screw means 114. The outer cylindrical surface of each of the support spacers is sized to lodge the slip-ring sub-assembly concentrically within the second end-cap of the sheath.

The slip-ring sub-assembly 16 is mechanically coupled to a swiveling joint encoder axle by means of a slotted female coupling 117 and a removable split collar clamp 53. This allows for quick decoupling during repair or reconfiguration. Note that the fastening screws 118,119 of the split collar clamp engage from opposite directions so as to provide balanced axial symmetry, and to allow for screwdriver access from one orientation by simply revolving the axle 50 one-half turn (180 degrees).

Now will be described the preferred electrical connection between slip-ring sub-assembly and adjacent electrical components. The connection between the adjacent swiveling joint 7c and the contact wires 105a,105b is in the form of two groups of connecting wires, each associated with a mated pair of detachable electrical connectors 54a,54b,55a, 55blocated on opposite sides of the slip-ring sub-assembly.

For each contact wire loop 105b there is a connecting wire 56b(one for each loop) soldered to the loop at a point proximate to the supporting rack prong 107 which does not contact the spring 110. Therefore, under this arrangement, the connecting wires are divided into two groups. One group (containing 56b) leads from the loops to the upper connector 54b, and the other group (containing 56a) leads to the lower connector 55b.

Electrical connection between the contact rings 102 and a more distal PCB can be in the form of connecting wires 125a–125d (one for each contact ring) running through axial channels 126 in the slip-ring sub-assembly axle 50. The channels are provided by a crenellated tube 127 concentrically mounted around the axle 50 beneath the contact rings 102. Electrical contact is made to a ring inserting the end 128a,128b of a connecting wire into a radial well 129 set into the inner surface of each contact ring. The connecting wires 125a–125d congregate at the distal end 130 of the sub-assembly where they bundle into a multi-conductor cable 58 leading to a more distal PCB 46.

Other means such as metallization of the supporting rack prongs and/or the sub-assembly axle and other various components may be used to form electrical contact between the slip-ring sub-assembly and the wiring leading to the adjacent swiveling joint or the adjacent PCB.

Each preferred slip-ring sub-assembly has nine conductive contact rings 102.

Figure 13:
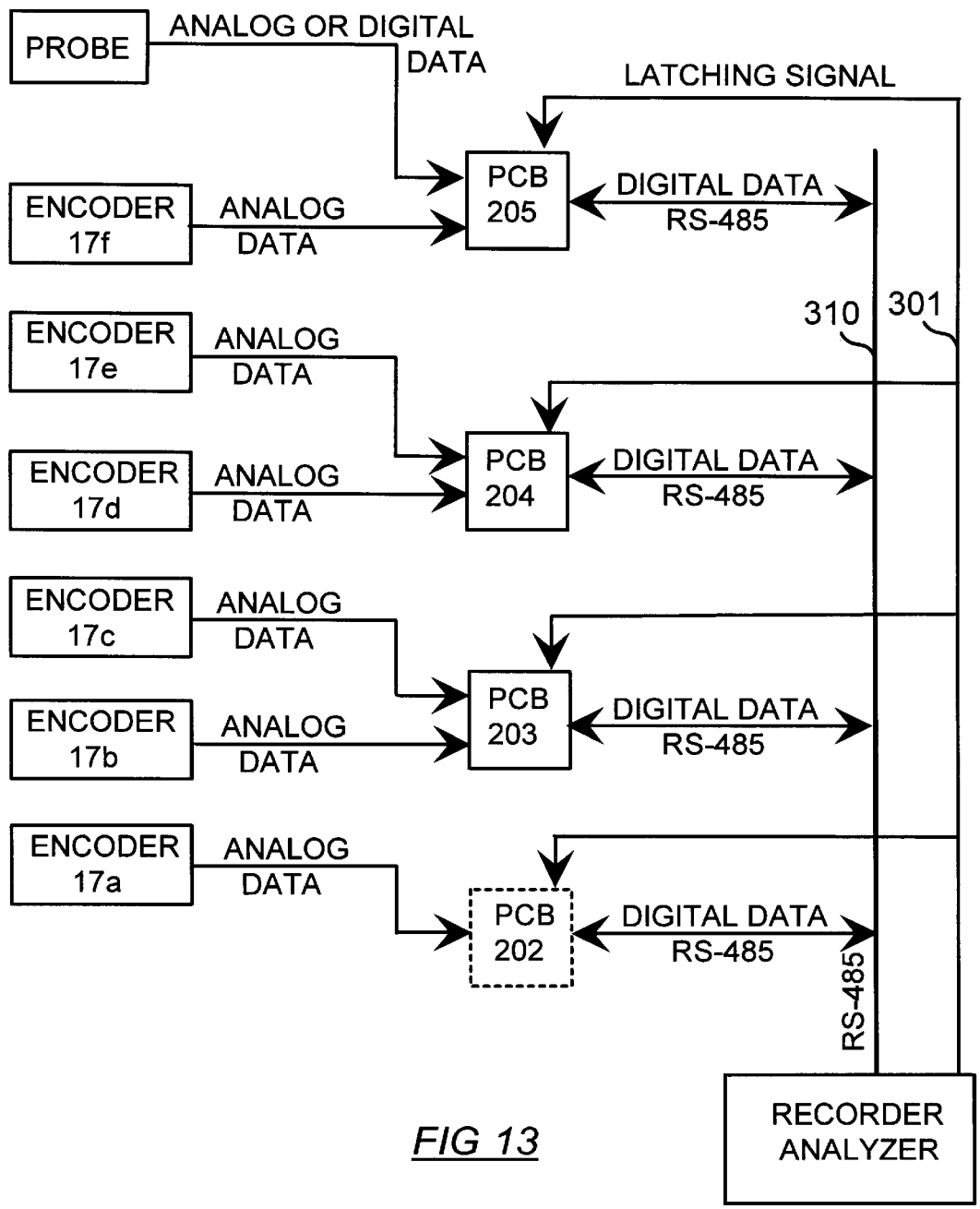
FIG. 13 is a diagrammatic functional block diagram of the electronic components of the invention.

The preferred electronic means for communicating the output of the probe and encoders to the recorder/analyzer will now be described with reference to FIGS. 2 and 13–14.

Analog signals emanating from the encoders are fed via wiring to signal reconditioning units 203,204,205 each mounted on a printed circuit board ("PCB") located in the adjacent transfer member more proximate to the base. Each of the PCBs residing in a transfer member are sized and dimensioned to fit within the tubular confines of the inner shaft.

Therefore, signals from the probe 6 (if there are any) and encoder 17f flow on wiring to PCB 205. Signals from encoders 17e and 17d flow to PCB 204. And, signals from encoders 17c and 17b flow to PCB 203. Signals from encoder 17a flow to a PCB 202 located on the base 2.

Each circuit board comprises microprocessor means for reconditioning the analog signals from the encoders into digital information to be sent to the recording and analysis system.

The PCBs therefore, are capable of receiving and digitizing analog data from their dedicated encoders or probe, and communicating with the recorder/analyzer.

In general, coarse positioning of the encoders is continuously monitored by a counter operating in the microprocessor to count the polarity changes in the encoder's output. Fine positioning occurs only when the microprocessor receives a latching signal 301 from the recorder/analyzer. A latching signal may be caused by any number of events such as the operator pushing a button on the probe or events generated by the recorder/analyzer software.

A latching signal 301 causes the microprocessor on each of the PCBs to initiate a fine positioning reading of all the encoders in sync at a specific instant in time. The precise voltage from each of the signals of each encoder is digitized and combined with the counter to derive a digitized fine position data word which is stored in the microprocessor until it can transmit its data to the recorder/analyzer.

Figure 14:
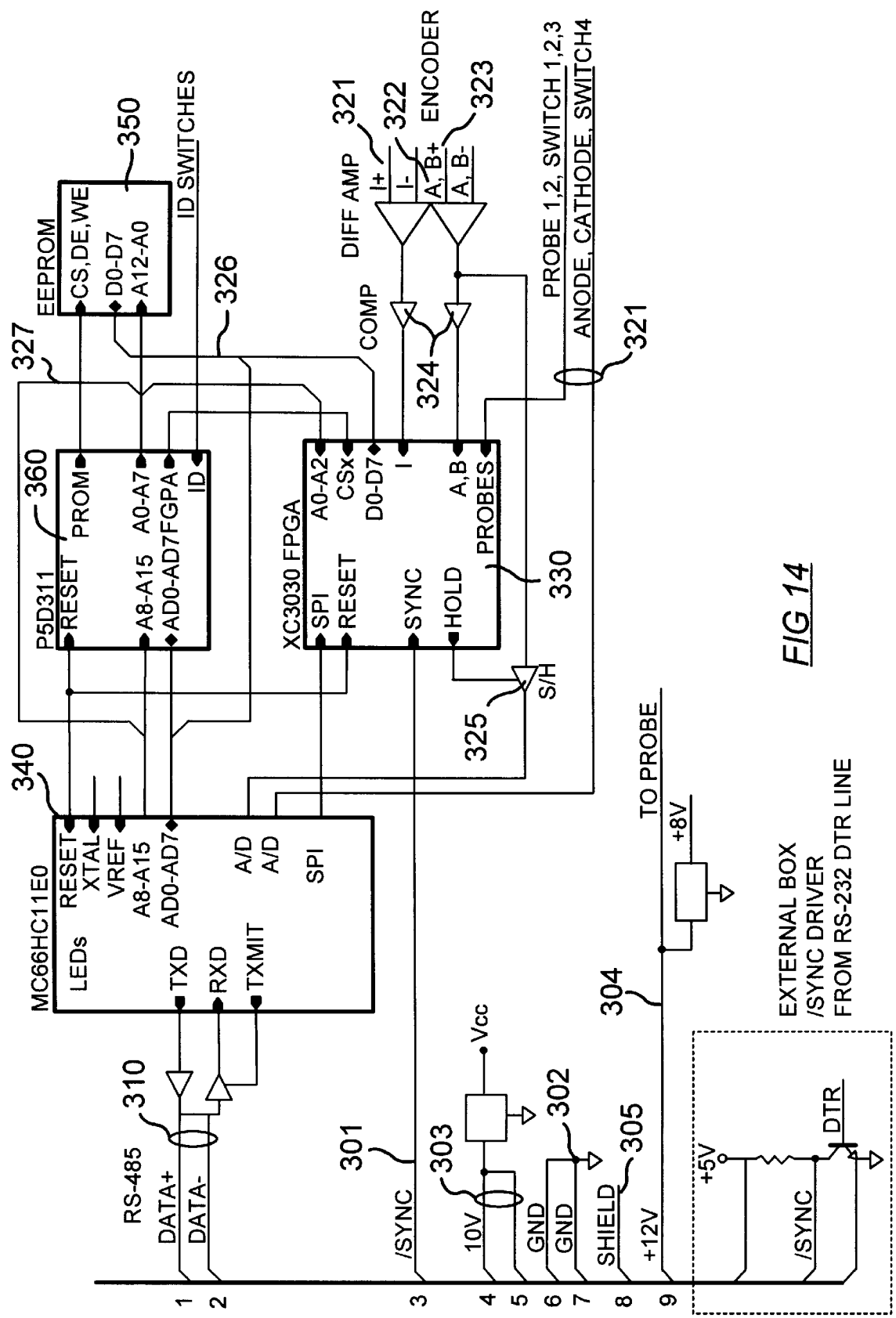
FIG. 14 is an electronic block diagram of the major components of a member mounted printed circuit board of the invention.

Referring now to FIG. 14, of the lines running through the slip-rings, two lines are devoted to ground 302, and another 305 as a shield. Two lines 303 supply power at+10 volts DC to the microprocessors, their attendant circuitry and the encoders. Double lines are used increase reliability and to divide power supply currents. This allows for the use of lighter gauge and hence lighter weight and more flexible wiring.

Another line 304 supplies +12 volts DC to power the probe 6 if needed. One sync line 301 is devoted to carrying the latching signal. The two remaining lines are devoted to carrying multiplexed data 310 to and from each of the PCBs. Two lines are used to support the preferred RS-485 data communication standard.

Analog data from the encoders comprises an index line 321 which signals when the zero position of the encoder is reached, and the two sinusoidal lines A 322 and B323. Comparators 324 effectively transform these signals into square waves monitored by a programmable field programmable gate array (FPGA) logic module 330 thereby tracking the coarse positioning of the encoders. The FPGA module also interprets any latching signal arriving on the sync line 301 and directs a voltage hold circuit 325 to initiate a hold of the current voltage outputs of the encoders. The hold circuit maintains this voltage long enough for the programmable microprocessor 340 to digitally sample the held voltage value. Programming for the microprocessor is stored in a memory module 350. Command communication carried on data 326 and address lines 327 between the microprocessor 340, the FPGA 330 and the memory module 350 is routed by a programmable data and address line monitoring unit 360.

The specific identification of the components in FIG. 14 is provided only for example. Those familiar with the art could substantially modify the components shown and their interactions without departing from the PCBs primary functions and hence, the invention.

By digitizing the signal from the encoders as physically close to the encoders as possible, interference is kept to a minimum. In this way resolution is improved over prior designs using preamplifiers set close to analog encoders.

Another advantage of this approach is that it allows the use of fewer electrical connectors (three per member), thereby increasing reliability. Connectors are provided only at one end of the PCB and at the slip-ring sub-assemblies. If data was further multiplexed and/or modulated upon the power lines, fewer connectors may be necessary.

Another advantage of the present invention is that it allows for modular disassembly and replacement of component parts. For example to replace encoder 17*c* one would first loosen split collar clamp 53 through holes 51,52. Next one would remove screws 36 fastening the sheath 31 of member 4 to the yoke 8 of joint 7*c*. The member 4 would then separate from the joint 7*c*, and electrical connector pairs 54*a*, 54*b* and 55*a*,55*b* would disconnect. Encoder-to-yoke mounting screws 69 would then be exposed. Removing these screws would allow for removal of the encoder save for wiring leading to the circuit board in member 3. Completely removing the encoder 17*c* would then require cutting the wiring or accessing the circuit board in member 3.

Therefore, when a single encoder or processor goes bad, it can be replaced on site. This feature also allows for members of varying sizes to be interchanged. The size of the measurement sphere is therefore only limited by the physical abilities of the operator.

Although the preferred embodiment utilizes a multi-conductor slip-ring, it should be noted that all signals to and from the joints of the arm may be further multiplexed and modulated upon the power supply line. Therefore, the slip-ring may be reduced to as few as two conductors, one being the power/signal line, and the other being a ground.

It should also be noted that power and signal transmission means other than a slip-ring may be used. For example, electromagnetic transmission through the air may be accomplished using radio waves, microwaves, light waves, or infrared waves. Fiber optic cables having swivel connectors may also be adapted for use in the arm.

While the preferred embodiments of the invention have been described, modifications can be made and other embodiments may be devised without departing from the spirit of the invention or the scope of the appended claims.

What is claimed is:

1. An articulated spatial coordinate measuring arm which comprises:

a supporting base;

a proximal transfer member having a proximal end and a distal end;

an intermediate transfer member having a proximal end and a distal end;

a distal transfer member having a proximal end and a distal end;

a probe having a proximal end and a distal end;

a first joint assembly swivelingly connecting said proximal end of said proximal member to said base;

a second joint assembly swivelingly and hingedly connecting the distal end of said proximal member to the proximal end of said intermediate member;

a third joint assembly swivelingly and hingedly connecting the distal end of said intermediate member to the proximal end of said distal member; and a fourth joint assembly hingedly connecting the proximal end of said probe to the distal end of said distal member;

wherein at least one of said first, second and third joint assemblies has at least one degree of freedom capable of sweeping through an unlimited arc;

wherein said at least one of said first, second and third joint assemblies comprises at least one multi-contact slip-ring sub-assembly for transmitting electrical signals therethrough; and wherein each of said first, second and third joint assemblies has an unlimited range of swiveling motion.

2. The arm of claim 1, wherein said electrical signals comprise data reflecting the orientation statuses of joint assemblies more distally located from the base than said at least one of said assemblies.

3. An articulated spatial coordinate measuring arm which comprises:

a supporting base;

a proximal transfer member having a proximal end and a distal end;

an intermediate transfer member having a proximal end and a distal end;

a distal transfer member having a proximal end and a distal end;

a probe having a proximal end and a distal end;

a first joint assembly swivelingly connecting said proximal end of said proximal member to said base;

a second joint assembly swivelingly and hingedly connecting the distal end of said proximal member to the proximal end of said intermediate member;

a third joint assembly swivelingly and hingedly connecting the distal end of said intermediate member to the proximal end of said distal member; and a fourth joint assembly hingedly connecting the proximal end of said probe to the distal end of said distal member;

wherein at least one of said first, second and third joint assemblies has at least one degree of freedom capable of sweeping through an unlimited arc; and wherein each of said members comprises:

an inner tubular shaft having a first end and an opposite second end;

said first end being fixedly attached to a first one of said joint assemblies at a first end of said member;

an outer tubular sheath co-axially surrounding said inner tubular shaft, and said sheath having a first extremity and an opposite second extremity;

said second extremity being fixedly attached to a second one of said joint assemblies at a second end of said member opposite said first end;

a first bearing rotatively mounting said first end of said shaft proximal to said first extremity of said sheath; and a second bearing rotatively mounting said second end of said shaft proximal to said second extremity of said sheath.

4. An articulated spatial coordinate measuring arm which comprises:

a supporting base;

a proximal transfer member having a proximal end and a distal end;

an intermediate transfer member having a proximal end and a distal end;

a distal transfer member having a proximal end and a distal end;

a probe having a proximal end and a distal end;

a first joint assembly swivelingly connecting said proximal end of said proximal member to said base;

a second joint assembly swivelingly and hingedly connecting the distal end of said proximal member to the proximal end of said intermediate member;

a third joint assembly swivelingly and hingedly connecting the distal end of said intermediate member to the proximal end of said distal member; and a fourth joint assembly hingedly connecting the proximal end of said probe to the distal end of said distal member;

wherein each of said first, second and third joint assemblies comprises at least one multi-contact slip-ring sub-assembly for transmitting electrical signals therethrough;

wherein each of said members comprises:

an inner tubular shaft having a first end and an opposite second end;

said first end being fixedly attached to a first one of said joint assemblies at a first end of said shaft;

an outer tubular sheath co-axially surrounding said inner tubular shaft, and said sheath having a first extremity and an opposite second extremity;

said second extremity being fixedly attached to a second one of said joint assemblies at a second end of said member opposite said first end;

a first bearing mounting said first end of said shaft proximal to said first extremity of said sheath; and a second bearing supporting said second extremity of said sheath proximal said second end of said shaft.

5. The arm of claim 4, wherein said second bearing comprises one of said slip-ring sub-assemblies.

6. The arm of claim 4, wherein:

said sheath has an inner diameter; and said shaft has an outer diameter which is at least 50 percent as large as said inner diameter of said sheath.

7. The arm of claim 6, which further comprises:

a first signal conditioning unit mounted within said shaft.

8. The arm of claim 7, wherein said first signal conditioning unit comprises:

means for digitizing analog electrical waveforms produced by a rotational motion transducer located adjacent to said shaft.

9. In a coordinate measuring device, having an articulated arm having at least one oblong rigid transfer member and a joint having an axis of rotation substantially in-line with a major axis of said member, an improvement comprising:

means for allowing said joint to have an unlimited range of swiveling motion;

wherein said means for allowing comprise:

said member comprising:

a first tubular sheath;

a second tubular shaft sized and dimensioned to freely rotate within said sheath; and means for rotatively mounting said shaft within said sheath; and wherein said improvement further comprises:

a first signal conditioning unit mounted within said shaft.

10. The improvement of claim 9, wherein said first signal conditioning unit comprises:

means for digitizing electrical signals produced by a rotational motion transducer located adjacent to said member.

11. The improvement of claim 9, wherein said means for allowing said joint to have an unlimited range of swiveling motion further comprise a multiconductor electrical slip-ring connector mounted within said member.

12. The improvement of claim 9, wherein:

said sheath has an inner diameter; and said shaft has an outer diameter which is at least 50 percent as large as said inner diameter of said sheath.

13. An articulated coordinate measuring arm comprising:

a plurality of rigid transfer members;

means for pivotably connecting a first one of said members to an adjacent one of said members;

said means comprise:

a joint assembly having at least one degree of freedom capable of sweeping through an unlimited arc; and wherein said first one of said transfer members comprises:

an inner tubular shaft having a first end and an opposite second end;

said first end being fixedly attached to said joint assembly;

an outer tubular sheath having a first extremity and an opposite second extremity;

a first bearing rotatively mounting said first end of said shaft proximal to said first extremity of said sheath; and a second bearing rotatively mounting said second end of said shaft proximal to said second extremity of said sheath, and coaxial with said first bearing.

14. The arm of claim 13, which further comprises a signal conditioning unit mounted within said shaft.

15. The arm of claim 14, wherein said signal conditioning unit comprises:

means for digitizing analog electrical waveforms produced by a rotational motion transducer located adjacent to said first one of said transfer members.

16. The arm of claim 13, wherein said joint assembly comprises at least one multi-contact slip-ring sub-assembly for transmitting electrical signals therethrough.

17. The arm of claim 13, wherein:
said sheath has an inner diameter; and
said shaft has an outer diameter which is at least 50 percent as large as said inner diameter of said sheath.

* * * * *

(12) EX PARTE REEXAMINATION CERTIFICATE (5426th)
United States Patent
Eaton

(10) Number: US 5,829,148 C1
(45) Certificate Issued: Jun. 27, 2006

(54) SPATIAL MEASURING DEVICE

(75) Inventor: Homer L. Eaton, 5025 Tierra Del Oro, Carlsbad, CA (US) 92008

(73) Assignee: Homer L. Eaton, Carlsbad, CA (US)

Reexamination Request:
No. 90/007,143, Jul. 29, 2004

Reexamination Certificate for:
Patent No.: 5,829,148
Issued: Nov. 3, 1998
Appl. No.: 08/636,590
Filed: Apr. 23, 1996

(51) Int. Cl.
*G01B 5/04* (2006.01)
*G01B 7/30* (2006.01)
*H01R 39/00* (2006.01)

(52) U.S. Cl. ............................. 33/503; 33/1 PT; 439/24
(58) Field of Classification Search ........................ None
See application file for complete search history.

(56) References Cited

U.S. PATENT DOCUMENTS

| 3,944,798 A | 3/1976 | Eaton | 33/1 M |
|---|---|---|---|
| 4,388,758 A | 6/1983 | Ernst et al. | 33/1 PT |
| 4,593,470 A | 6/1986 | Davies | 33/1 PT |
| 4,888,877 A | 12/1989 | Enderle et al. | |
| 4,963,728 A | 10/1990 | Hof et al. | |
| 5,611,147 A | 3/1997 | Raab | |
| 5,829,148 A | 11/1998 | Eaton | 33/503 |

FOREIGN PATENT DOCUMENTS

| DE | 33 42 403 A1 | 7/1985 |
|---|---|---|
| DE | 41 40 294 A1 | 1/1993 |
| EP | 0 331 914 A2 | 9/1989 |
| EP | 0 730 210 A1 | 4/1996 |
| JP | 58-21501 | 2/1983 |
| JP | 59-81087 | 5/1984 |
| WO | WO 95/02801 | 1/1995 |

OTHER PUBLICATIONS

U.S. District Court, Southern District of California (San Diego) Civil Docket for Case #: 03–CV–2355, (docket as of Nov. 17, 2005), dated Nov. 22, 2005.

[Proposed] Order Granting Plaintiff's Motion of Supplementation of the Court's Order Granting Summary Judgment of Infringement, dated Aug. 22, 2005.

Plaintiffs' Notice of Motion and Motion for Supplementation of the Court's Order Granting Summary Judgment of Infringement, dated Aug. 22, 2005.

Plaintiffs' Memorandum of Points and Authorities in Support of Plaintiffs' Motion for Supplementation of the Court's Order Granting Summary Judgment of Infringement, dated Aug. 22, 2005.

Plaintiff's Appendix of Authorities in Support of Plaintiffs' Motion for Supplementation of the Court's Order Granting Summary Judgment of Infringement, dated Aug. 22, 2005.

Declaration of Philip M. Nelson in Support of Plaintiffs' Reply to Defendant's Opposition to Plaintiffs' Motion for Supplementation of the Court's Granting Summary Judgment of Infringment, dated Sep. 12, 2005.

Plaintiffs' Opposition to Defendant's Motion for Reconsideration of the Court's Summary Judgment Ruling and Claim Construction Order, and for a New Markman Hearing, dated Sep. 2, 2005.

(Continued)

*Primary Examiner*—Erik Kielin

(57) ABSTRACT

An articulated coordinate measuring arm having swiveling joints which are unlimited by an end-stops. Power and signals are transmitted through a swiveling joint using a multi-conductor electrical slip-ring sub-assembly. Joint position transducer signal conditioners are closely located to the joint position transducers to reduce signal noise degradation. Rigid transfer members connecting the joints comprise a freely rotating shaft mounted within an outer sheath, wherein both shaft and sheath extend substantially the length of the transfer member, and the shaft outer diameter approaches that of the sheath inner diameter.

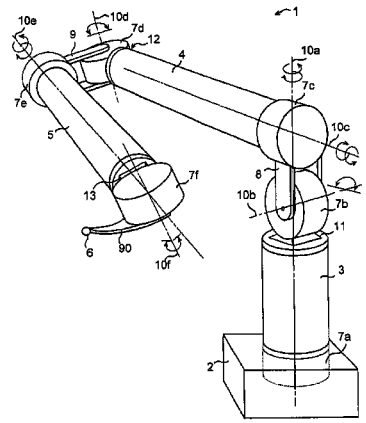

OTHER PUBLICATIONS

Declaration of Philip M. Nelson in Support of Plaintiffs' Opposition to Defendant's Motion for Reconsideration of the Court's Summary Judgment Ruling and Claim Construction Order and Motion for a New Markman Hearing, dated Sep. 2, 2005.
Plaintiffs' Appendix of Authorities in Support of Plaintiffs' Opposition to Defendant's Motion for Reconsideration of the Court's Summary Judgment Ruling and Claim Construction Order, and for a New Markman Hearing, dated Sep. 2, 2005.
Memorandum of Points and Authorities in Partial Opposition to Plaintiffs' Motion for Supplementation of the Court's Order Granting Summary Judgment of Infringement, dated Sep. 2, 2005.
Declaration of Richard A. Clegg in Opposition to Plaintiffs' Motion for Supplementation of the Court's Order Granting Summary Judgment of Infringement, dated Sep. 2, 2005.
Defendant Faro Technologies' Reply Memorandum in Support of Its Motion for Reconsideration, dated Sep. 12, 2005.
Reply Declaration of Richard A. Clegg in Support of Faro Technologies' Motion for Reconsideration of the Court's Summary Judgment Ruling and Claim Construction Order, dated Sep. 12, 2005.
Plaintiffs' Reply to Defendant's Opposition to Plaintiffs' Motion for Supplementation of the Court's Order Granting Summary Judgment of Infringement, dated Sep. 12, 2005.
Declaration of Philip M. Nelson in Support of Plaintiffs' Motion for Supplementation of the Court's Order Granting Summary Judgment of Infringement.
Order Granting Defendant's Motion for Reconsideration and Motion for a New Markman Hearing and Vacating (1) Superseding Markman Order and (2) Order Granting Plaintiff's Motion for Summary Judgment of Infringement and Denying Defendant's Cross Motion for No Infringement, dated Sep. 20, 2005.
Defendant Faro Technologies' Supplemental Markman Brief, dated Sep. 26, 2005.
Minutes of the United States District Court, Southern District of California, dated Monday, Oct. 3, 2005.
Order Limiting Depositions Regarding Damages, dated Oct. 6, 2005.
Plaintiffs' Supplemental Markman Hearing PowerPoint Presentation, dated Oct. 3, 2005.
Plaintiffs' Supplemental Memorandum Regarding Construction of Certain Terms of the Asserted Claims of U.S. Pat. No. 5,829,148, dated Sep. 26, 2005.
Declaration of J. David Evered in Support of Plaintiffs' Supplemental Memorandum Regarding Construction of Certain Terms of the Asserted Claims of U.S. Pat. No. 5,829,148, dated Sep. 26, 2005.
Parties' Joint Supplemental Spreadsheets (Non–Redlined and Redlined) Regarding Construction of Selected Terms of the Asserted Claims of U.S. Pat. No. 5,829,148 for Supplemental Markman Hearing, dated Sep. 26, 2005.
Superseding Claim Construction Order for U.S. Pat. No. 5,829,148, dated Oct. 13, 2005.
Defendant's Notice of Motion and Supplemental Motion for Summary Judgment of Non–Infringement, dated Oct. 17, 2005.
Defendant's Memorandum of Law in Support of Its Motion for Summary Judgment of Non–Infringement, dated Oct. 17, 2005.
Declaration of Dr. Thomas Kurfess in Support of Defendant's Renewed Motion for Summary Judgment of Non–Infringement, dated Oct. 17, 2005.
Declaration of Dr. Michael Sidman in Support of Defendant's Renewed Motion for Summary Judgment of Non–Infringement, dated Oct. 17, 2005.
Defendant's Notice of Motion and Motion for Summary Judgment of Invalidity of Claims 1 and 2 of U.S. Pat. No. 5,829,148, dated Oct. 17, 2005.
Defendant's Memorandum of Law in Support of Its Motion for Summary Judgment of Invalidity of Claims 1 and 2 of U.S. Pat. No. 5,829,148, dated Oct. 17, 2005.
Declaration of Richard A. Clegg in Support of Defendant Faro's Motion for Summary Judgment of (1) Non–Infringement and (2) Invalidity of Claims 1 and 2 of U.S. Pat. No. 5,829,148, dated Oct. 17, 2005.
Plaintiffs' Appendix of Authorities in Support of Plaintiffs' Renewed Motion for Summary Judgment of Infringement, dated Oct. 17, 2005.
Declaration of Philip M. Nelson in Support of Plaintiff's Renewed Motion for Summary Judgment of Infringement, dated Oct. 17, 2005.
Declaration of David A. Dornfeld in Support of Plaintiffs' Renewed Motion for Summary Judgment of Infringement, dated Oct. 17, 2005.
Defendant's Memorandum of Law in Opposition To Plaintiffs' Renewed Motion for Summary Judgment of Infringement, dated Oct. 31, 2005.
Declaration of Richard A. Clegg in Opposition To Plaintiff's Renewed Motion for Summary Judgment of Infringement, dated Oct. 31, 2005.
Plaintiff's Opposition to Defendant's Motion for Summary Judgment of invalidity of Claims 1 and 2 of U.S. Pat. No. 5,829,148, dated Oct. 31, 2005.
Declaration of Philip M. Nelson in Support of Plaintiffs' Opposition To Defendant's Supplemental Motion for Summary Judgment of Non–Infringement, dated Oct. 31, 2005.
Declaration of David A. Dornfeld, Ph.D. in Support of Plaintiffs' Opposition To Defendant's Supplemental Motion for Summary Judgment of Non–Infringement, dated Oct. 31, 2005.
Plaintiff's Opposition To Defendant's Motion for Summary Judgment of Invalidity of Claims 1 and 2 of U.S. Pat. No. 5,829,148, dated Oct. 31, 2005.
Declaration of J. David Evered in Support of Plaintiffs' Opposition To Defendant's Motion for Summary Judgment of Invalidity, dated Oct. 31, 2005.
Declaration of Robert J. Hocken, Ph.D., in Support of Plaintiffs' Oppositions to Defendant's (1) Supplemental Motion for Summary Judgment of Non–Infringement, and (2) Motion for Summary Judgment of Invalidity, dated Oct. 31, 2005.
Plaintiffs' PowerPoint Presentation, dated Nov. 7, 2005.
Order Denying Plaintiffs' Motion for Summary Judgment of Infringement and Defendant's Motion for Summary Judgment of Non–Infringement of U.S. Pat. No. 5,829,148 and Denying Defendant's Motion for Summary Judgment of Invalidity Claims 1 and 2 of U.S. Pat. No. 5,829,148, dated Nov. 11, 2005.
Declaration of William J. Cass in Support of Defendant's Motion for Summary Judgment in Case No. 03 CV 2355 B (WMC), dated May 26, 2005, (redacted version in 95 sheets).

U.S. District Court, Southern District of California (San Diego) Civil Docket for Case #: 03–CV–2355, (docket as of Aug. 1, 2005), dated Aug. 5, 2005.

Civil Cover Sheet, dated Nov. 25, 2003.

Complaint for Infringement of U.S. Pat. No. 5,829,148; Claim for Attorneys' Fees; and Demand for Jury Trial, dated Nov. 25, 2003.

Reply to Counterclaims, dated Mar. 8, 2004.

Declaration of. J. David Evered in Support of Plaintiff's Motion to Strike Defendant's Motion for Reconsideration Regarding Construction of the Term "Transfer Member" in Case No. 03–CV–2355 B (WMc), dated Jan. 21, 2005.

Plaintiff's Memorandum of Points and Authorities in Support of Plaintiff's Motion to Strike Defendant's Motion for Reconsideration Regarding Construction of the Term "Transfer Member" in Case No. 03–CV–2355 B (WMc), dated Jan. 21, 2005.

Plaintiffs' Notice of Motion and Motion to Strike Defendant's Motion for Reconsideration Regarding Construction of the Term "Transfer Member" in Case No. 03–CV–2355 B (WMc), dated Jan. 21, 2005.

First Supplemental Complaint for Infringement of U.S. Pat. No. 5,829,148; Claims for Attorneys' Fees; and Demand for Jury Trial, dated Mar. 24, 2005.

Stipulation and (Proposed) Order Granting Leave for Romer/Cimcore to File: "First Supplemental Complaint for Infringement of U.S. Pat. No. 5,829,148; Claim for Attorneys; Fees; and Demand for Jury Trial," dated Mar. 29, 2005.

Reply to Counterclaims, dated May 11, 2005.

Answer and Counterclaims for Defendant Faro Technologies; Demand for Jury Trial, dated Jan. 26, 2004.

Points and Authorities in Support of Defendants' Proposed Construction of the term "Multi–Contact Slip Ring" in Case No. 03–CV–2355 B (WMc), dated Nov. 24, 2004.

Defendant's Notice of Motion and Motion for Reconsideration Regarding the Construction of the Term "Transfer Member" in Case No. 03 CV 2355 B (WMC), dated Dec. 15, 2004.

Memorandum in Support of Defendant's Motion for Reconsideration Regarding the Construction of the Term "Transfer Member" in Case No. 03 CV 2355 B (WMC), dated Dec. 25, 2004.

Defendant Faro Technologies' Answer to First Supplemental Complaint and Counter–Complaint; Demand for Jury Trial, dated Apr. 18, 2005.

Joint Report and Discovery Plan Pursuant to Fed. R. Civ. P. 26 (f), dated Apr. 29, 2004.

Parties' Joint Claim Construction Spreadsheet in Case No. 03–CV–2355 B (WMc), dated Oct. 18, 2004.

Claim Construction Order for U.S. Pat. No. 5,829,148, dated Nov. 29, 2004.

Order Denying Defendant's Motion for Reconsideration of Claim Construction Order for U.S. Pat. No. 5,829,148, dated Jan. 26, 2005.

Stipulation and (Proposed) Order Granting Leave for Romer/ Cimcore to File: "First Supplemental Complaint for Infringement of U.S. Pat. No. 5,829,148; Claim for Attorneys' Fees' and Demand for Jury Trial," dated Mar. 29, 2005.

Order Granting Plaintiffs' Motion for Summary Judgment of Infringement and Denying Defendant's Motion for Summary Judgment of Noninfringement of U.S. Pat. No. 5,829, 148, dated Jul. 11, 2005.

Superseding Claim Construction Order for U.S. Pat. No. 5,829,148, dated Jul. 11, 2005.

Substituted Plaintiffs' Reply to Defendant's Opposition to Plaintiffs' Motion for Summary Judgment of Infringement, dated in Case No. 03–CV–2355 B (WMc), dated Jun. 22, 2005.

Declaration of J. David Evered in Support of Plaintiffs' Reply to Defendant's Opposition to Plaintiffs' Motion for Summary Judgment of Infringement in Case No. 03–CV–2355 B (WMc), dated Nov. 29, 2004.

Defendant's Memorandum of Law in Opposition to Plaintiffs' Motion for Summary Judgment of Infringement in Case No. 03 CV 2355 B (WMC), dated Jun. 13, 2005.

Declaration of Richard A. Clegg in Opposition to Plaintiffs' Motion for Summary Judgment of Infringement, dated Jun. 13, 2005.

Plaintiffs' Memorandum of Points and Authorities in Support of their Motion for Summary Judgment of Infringement of U.S. Pat. No. 5,829,148, dated Apr. 18, 2005.

Declaration of J. David Evered in Support of Plaintiffs' Motion for Summary Judgment of Infringement in Case No. 03–CV–2355 B (WMc), dated Apr. 18, 2005.

Declaration of David A. Dornfeld in Support of Plaintiffs' Motion for Summary Judgment of Infringement in Case No. 03–CV–2355 B (WMc), dated Apr. 14, 2004.

Defendant's Reply Memorandum in Support of Its Motion for Summary Judgment of Non–Infringement in Case No. 03 CV 2355 B (WMC), dated Jun. 20, 2005.

Summary Judgment Presentation presented by: Faro Technologies, Inc.

Plaintiffs' Opposition to Defendant's Motion for Summary Judgment of Non–Infringement of U.S. Pat. No. 5,829,148, dated Jun. 13, 2005.

Declaration of J. David Evered in support of Plaintiffs' Opposition to Defendant's Motion for Summary Judgment of Non–Infringement of U.S. Pat. No. 5,829,148, dated Jun. 13, 2005.

Defendant's Memorandum of Law in Support of Its Motion for Summary Judgment of Non–Infringement in Case No. 03 CV 2355 B (WMC), dated May 27, 2005.

Declaration of Dr. Michael Sidman in support of Defendant's Motion for Summary Judgment of Non–infringement in Case No. 03 CV 2355 B (WMC), dated May 23, 2005.

Declaration of Dr. Thomas Kurfess in Support of Defendant's Motion for Summary Judgment of Non–Infringement in Case No. 03 CV 2355 B (WMC), dated May 23, 2005.

Declaration of William J. Cass in Support of Defendant's Motion for Summary Judgment in Case No. 03 CV 2355 B (WMC), dated May 26, 2005.

Defendant's Proposed Discovery and Summary Judgment Briefing Plan in Case No. 03 CV 2355 B (WMC), dated Mar. 1, 2005.

Memorandum of Points and Authorities in Support of Defendant Faro Technologies' Motion for Reconsideration of the Court's Summary Judgment Ruling and Claim Construction Order, and for a New Markman Hearing, in View of the Federal Circuit's En Banc Decision in Phillips v. AWH Corporation, dated Jul. 26, 2005.

Notice of Motion And Motion for Reconsideration of the Court's Summary Judgment Ruling and Claim Construction Order, and for a New Markman Hearing, In View of the Federal Circuit's En Banc Decision in Phillips v. AWH Corporation, dated Sep. 12, 2005.

Declaration of Richard A. Clegg in Support of Faro Technologies' Motion for Reconsideration of the Court's Summary Judgment Ruling and Claim Construction Order, and for a New Markman Hearing, In View of the Federal Circuit's En Banc Decision in Phillips v. AWH Corporation, dated Jul. 26, 2005.

Defendant Faro's Markman Brief in Case No. 03 CV 2355 B (WMC), dated Oct. 29, 2004.

Plaintiff's Memorandum Regarding Construction of the Asserted Claims of U.S. Pat. No. 5,829,148 (Markman Brief) in Case No. 03–CV–2355 B (WMC), dated Nov. 1, 2004.

Defendant Faro's Appendix of Exhibits to Markman Brief in Case No. 03 CV 2355 B (WMC), dated Nov. 1, 2004.

Declaration of Brenton R. Babcock in Support of Plaintiff's Memorandum Regarding Construction of the Asserted Claims of U.S. Pat. No. 5,829,148 (Markman Brief), dated Nov. 1, 2004.

Published Patent Application DE 33 42 403 A1, Publication Date: Jul. 18, 1985 (certified English translation).

DE 41 40 294 A1, Publication Date: Jan. 7, 1993, (certified English translation).

Japanese Patent Application Publication No.: Showa 58–21501, Publication Date: Feb. 8, 1983 (certified English translation).

Japanese Patent Application Publication No.: Showa 59–81087, Publication Date: May 10, 1984 (certified English translation).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–17 is confirmed.

* * * * *

(12) EX PARTE REEXAMINATION CERTIFICATE (6235th)
United States Patent
Eaton

(10) Number: US 5,829,148 C2
(45) Certificate Issued: May 20, 2008

(54) SPATIAL MEASURING DEVICE

(75) Inventor: Homer L. Eaton, Carlsbad, CA (US)

(73) Assignee: Hexagon Metrology AB, Landskrona (SE)

Reexamination Request:
No. 90/007,721, Sep. 15, 2005

Reexamination Certificate for:
Patent No.: 5,829,148
Issued: Nov. 3, 1998
Appl. No.: 08/636,590
Filed: Apr. 23, 1996

Reexamination Certificate C1 5,829,148 issued Jun. 27, 2006

(51) Int. Cl.
*G01B 5/008* (2006.01)
*G01B 5/004* (2006.01)
*H01R 35/02* (2006.01)
*H01R 35/00* (2006.01)
*H01R 39/08* (2006.01)
*H01R 39/00* (2006.01)

(52) U.S. Cl. .............................. 33/503; 33/1 PT; 439/24
(58) Field of Classification Search ........................ None
See application file for complete search history.

(56) References Cited

U.S. PATENT DOCUMENTS 3,482,711 A    12/1969    Bohme et al.

(Continued)

FOREIGN PATENT DOCUMENTS

| DE | 01 51 999    | 11/1981 |
|----|--------------|---------|
| DE | 33 42 403 A1 | 7/1985  |
| DE | 41 23 781 A1 | 1/1993  |
| DE | 41 40 294 A1 | 1/1993  |
| DE | 43 45 091 A1 | 7/1995  |
| EP | 0 331 914 A2 | 9/1989  |
| EP | 0 730 210 A1 | 4/1996  |
| FR | 2597969      | 10/1987 |
| FR | 2 634 279    | 1/1990  |
| FR | 2 740 546    | 1/1998  |

(Continued)

OTHER PUBLICATIONS

Published Patent Application DE 33 42 403 A1, Publication Date: Jul. 18, 1985 (certified English translation).
DE 41 40 294 A1, Publication Date: Jan. 17, 1993 (certified English translation.
Japanese Patent Application Publication No.: Showa 58–21501; Publication Date: Feb. 8, 1983 (certified English translation).
Japanese Patent Application Publication No.: Showa 58–81087, Publication Date: May 10, 1984 (certified English translation).
French Patent Application Publication No. 2 634 279; Publication Date: Jan. 19, 1990 (certified English translation).
Canadian Office Action, Application No. 2,252,481, issued on Mar. 10, 2005.
Correspondence dated Dec. 6, 2005 addressed to J. David Evered, Esq. from Richard A. Clegg, Esq. regarding *Cimcore Corporation, et al v. Faro Technologies*.
Legal Pleading: Faro's Brief Submitted Pursuant to the Court's Order Dated May 23, 2006, Regarding Faro's Request to (1) Supplement Its Evidence And Expert Report On Invalidity; And (2) Amend Its Answer.
European Patent Office Action, Application No. 97922439.1,dated May 24, 2006.

*Primary Examiner*—Erik Kielin

(57) ABSTRACT

An articulated coordinate measuring arm having swiveling joints which are unlimited by an end-stops. Power and signals are transmitted through a swiveling joint using a multi-conductor electrical slip-ring sub-assembly. Joint position transducer signal conditioners are closely located to the joint position transducers to reduce signal noise degradation. Rigid transfer members connecting the joints comprise a freely rotating shaft mounted within an outer sheath, wherein both shaft and sheath extend substantially the length of the transfer member, and the shaft outer diameter approaches that of the sheath inner diameter.

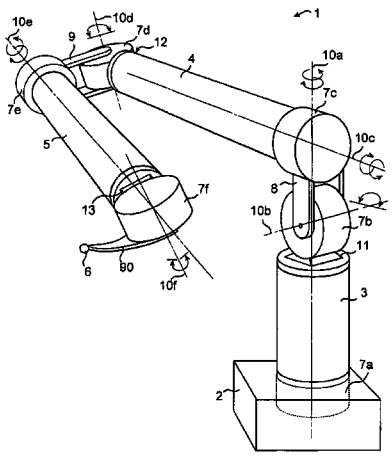

U.S. PATENT DOCUMENTS

| | | |
|---|---|---|
| 3,515,963 A | 6/1970 | Moss |
| 3,541,840 A | 11/1970 | Phelan |
| 3,944,798 A | 3/1976 | Eaton |
| 3,976,885 A | 8/1976 | Brunnet et al. |
| 3,983,399 A | 9/1976 | Cox, Jr. et al. |
| 4,008,400 A | 2/1977 | Brunnett et al. |
| 4,071,769 A | 1/1978 | Brunnett et al. |
| 4,190,318 A | 2/1980 | Upton, Jr. |
| 4,261,107 A | 4/1981 | Coleman et al. |
| 4,277,134 A | 7/1981 | Upton, Jr. |
| 4,306,458 A | 12/1981 | Weyns et al. |
| 4,333,635 A | 6/1982 | Koukal |
| 4,356,378 A | 10/1982 | Cloos et al. |
| 4,388,758 A | 6/1983 | Ernst et al. |
| 4,398,113 A | 8/1983 | Lewis et al. |
| 4,398,791 A | 8/1983 | Dorsey |
| 4,436,367 A | 3/1984 | Lewis et al. |
| 4,492,427 A | 1/1985 | Lewis et al. |
| 4,502,746 A | 3/1985 | Wawra et al. |
| 4,504,227 A | 3/1985 | Lohn |
| 4,525,025 A | 6/1985 | Hohmann et al. |
| 4,544,215 A | 10/1985 | Fritsch |
| 4,546,645 A | 10/1985 | Delmulle et al. |
| 4,593,470 A | 6/1986 | Davies |
| 4,604,813 A | 8/1986 | Kawanami et al. |
| 4,676,002 A | 6/1987 | Slocum |
| 4,703,443 A | 10/1987 | Moriyasu |
| 4,815,006 A | 3/1989 | Andersson et al. |
| 4,849,643 A | 7/1989 | Mundy |
| 4,888,877 A | 12/1989 | Enderle et al. |
| 4,891,889 A | 1/1990 | Tomelleri |
| 4,903,413 A | 2/1990 | Bellwood |
| 4,937,759 A * | 6/1990 | Vold .......................... 700/262 |
| 4,963,728 A | 10/1990 | Hof et al. |
| 4,990,839 A * | 2/1991 | Schonlau ................... 700/248 |
| 5,016,464 A | 5/1991 | Tomelleri |
| 5,054,189 A | 10/1991 | Bowman et al. |
| 5,084,981 A | 2/1992 | McMurtry et al. |
| 5,088,337 A | 2/1992 | Bennett |
| 5,140,773 A | 8/1992 | Miwa et al. |
| 5,148,377 A | 9/1992 | McDonald |
| 5,175,905 A | 1/1993 | Gutschmit |
| 5,224,138 A | 6/1993 | Hirao et al. |
| 5,241,875 A | 9/1993 | Kochanneck |
| 5,246,290 A | 9/1993 | Bolz |
| 5,293,107 A | 3/1994 | Akeel |
| 5,297,225 A | 3/1994 | Snow et al. |
| 5,363,821 A | 11/1994 | Rao et al. |
| 5,394,209 A | 2/1995 | Stiepel et al. |
| 5,402,582 A | 4/1995 | Raab |
| 5,408,754 A | 4/1995 | Raab |
| 5,412,880 A | 5/1995 | Raab |
| 5,413,508 A | 5/1995 | Obara |
| 5,418,567 A | 5/1995 | Boers et al. |
| 5,505,003 A | 4/1996 | Evans et al. |
| 5,510,977 A | 4/1996 | Raab |
| 5,528,505 A | 6/1996 | Granger et al. |
| 5,611,147 A | 3/1997 | Raab |
| 5,768,792 A | 6/1998 | Raab |
| 5,791,843 A | 8/1998 | Dreier |
| 5,829,148 A | 11/1998 | Eaton |
| 5,978,748 A | 11/1999 | Raab |

FOREIGN PATENT DOCUMENTS

| | | |
|---|---|---|
| JP | 58-21501 | 2/1983 |
| JP | 59-81087 | 5/1984 |
| JP | 05-031685 | 2/1993 |
| RU | 375474 | 3/1973 |
| WO | WO 95/02801 | 1/1995 |
| WO | WO 97/40336 | 10/1997 |

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–17 is confirmed.

* * * * *